No. 788,478. PATENTED APR. 25, 1905.
A. S. KOCH.
CIGAR MOLD.
APPLICATION FILED OCT. 27, 1904.
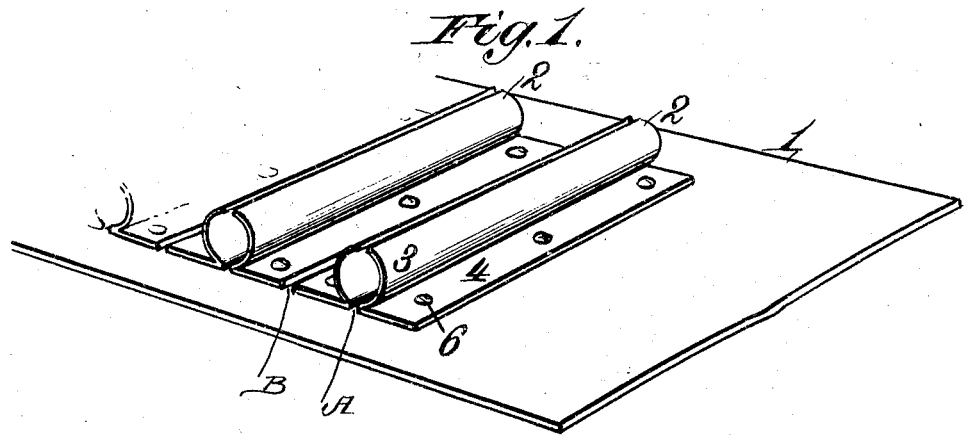
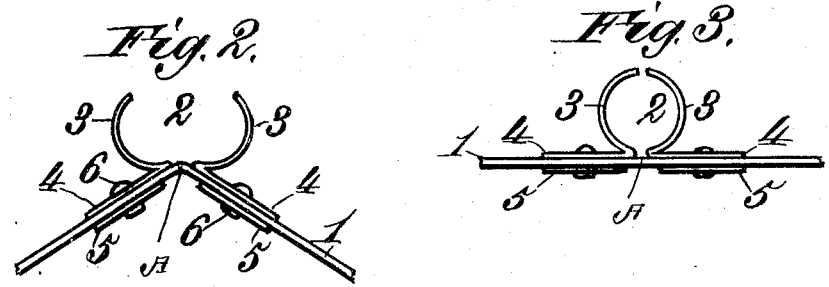
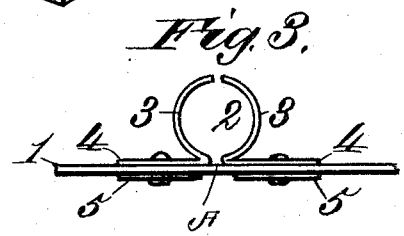
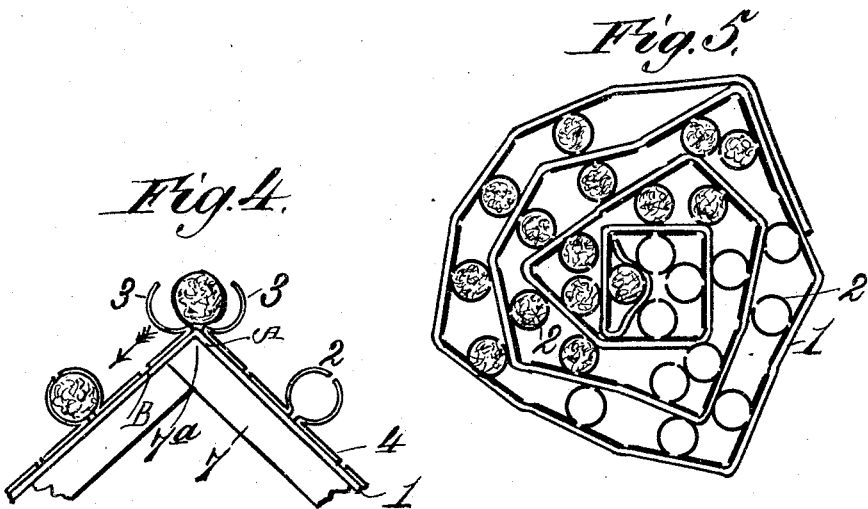
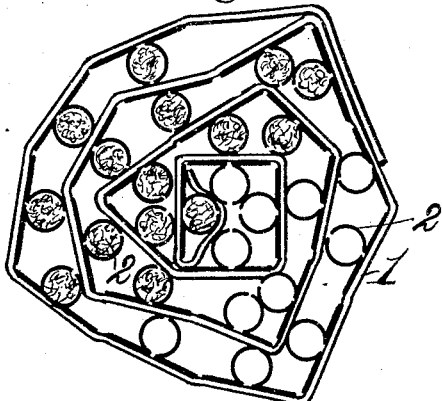
Witnesses
Robert Everett
James L. Norris Jr.
Inventor
Alfred S. Koch
By James L. Norris
Att'y No. 788,478. Patented April 25, 1905.

UNITED STATES PATENT OFFICE.

ALFRED S. KOCH, OF LANCASTER, PENNSYLVANIA.

CIGAR-MOLD.

SPECIFICATION forming part of Letters Patent No. 788,478, dated April 25, 1905.

Application filed October 27, 1904. Serial No. 230,193.

*To all whom it may concern:*

Be it known that I, ALFRED S. KOCH, a citizen of the United States, residing at Lancaster, in the county of Lancaster and State of Pennsylvania, have invented new and useful Improvements in Cigar-Molds, of which the following is a specification.

My invention relates to improvements in cigar-molds, and has for its object to provide a novel, efficient, and economical mold into which the bunches may be inserted with facility and by which the bunches are compressed and shaped.

The cigar-mold of my invention is one capable of indefinite extension.

To the ends stated my invention resides in a cigar-mold, as hereinafter described and claimed, reference being had to the accompanying drawings, in which—

Figure 1 is a perspective view; Fig. 2, an edge or end view with the jaws of the mold-sections opened; Fig. 3, a similar view, the jaws being closed together; Fig. 4, a view illustrating one manner of using the mold. Fig. 5 illustrates the mold rolled up with the bunches disposed in the mold-sections for the purpose of setting thereof or for storage, as may be desired.

In the said drawings the reference-numeral 1 designates a flexible strip which may be of any desired length and of any suitable material. I have found canvas a suitable material, but of course do not restrict my invention thereto. Secured to this flexible strip are series of pairs of mold-sections 2, each pair of mold-sections constituting a complete mold. The pair of jaws constituting each complete mold are fashioned to completely inclose and compress and give the desired shape to the bunch of tobacco—that is to say, while the configuration of the members of the mold may vary in respect of shape in order to impart a corresponding shape to the bunch they are in all cases so fashioned that they completely inclose, compress, and give shape to the bunch. The jaws or elements composing a given mold are separated from each other—that is to say, they are attached to the flexible strip in such interrelation that there is a space between the jaws bridged by a portion of the strip itself, as indicated by A, whereby when the mold is drawn across an angle of a work bench or table, as hereinafter described, the mold-sections will be opened out from each other, as illustrated in Fig. 2 of the drawings, to permit the insertion thereinto of a bunch, as shown in Fig. 2, and whereby when the mold is drawn along the flat surface of the work table or bench, as illustrated in Fig. 4, the mold-sections will close together in bunch compressing and shaping position, as shown in said Fig. 4 and also in Figs. 3 and 5. Each mold composed of a pair of jaws or mold-sections in the manner hereinbefore described is separated from every other such mold in the series of molds arranged upon the flexible strip by a space or interval, which space is bridged by the flexible strip, as indicated at B in the drawings, so that the strip carrying the series of molds may be wound upon itself in convolutions, as shown in Fig. 5 of the drawings. In the specific illustration of my invention disclosed in the drawings each jaw is provided with a lateral wing 4, and in alinement therewith on the opposite sides of the flexible strip are plates 5, through which plates and wings pass rivets or other suitable fastening devices 6. The particular manner of securing the mold-sections 2 to the strip is not exclusive, as other manners of connection may be adopted within the scope of my invention.

A suitable but not exclusive manner of use of my improved mold is illustrated in Fig. 4 of the drawings, wherein the reference-numeral 7 designates a table or other work-bench upon which the mold may be moved, having an angle 7ª, over which the flexible strip is caused to pass, imparting thereto a deflection which causes the jaws of the mold-sections to open out in the manner illustrated to receive a bunch. After passing the angle of the table or work-bench the flexible strip resumes its normal or flat condition, causing the jaws to close upon the bunch, as illustrated in Fig. 4, and compress and shape the bunch. The flexible strip may be provided with as many mold-sections as may be desired, and the strip can be passed over the work-bench and the jaws caused to open out to receive a bunch and the bunches be introduced thereinto successively with great ease and rapidity. After the complement of mold-sections with which a given strip is provided has been filled it may be laid away in a flat condition, or the strip may be rolled up with the mold-section jaws interiorly arranged, in the manner illustrated in Fig. 5 of the drawings, in either of which conditions the bunch shaping and compressing action of the mold-jaws will be exerted. In this condition the mold may be allowed to rest to permit the bunches to set or, if desired, may be stored away until thereafter required to be wrapped.

Having thus described my invention, what I claim is—

1. A cigar-mold consisting of a flexible strip and a plurality of molds attached thereto, each mold consisting of a pair of jaws fashioned to completely inclose a bunch, and shaped to impart the desired shape to the bunch, and each jaw of each pair of jaws constituting a mold attached directly to the flexible strip.

2. A cigar-mold consisting of a flexible strip, and a plurality of molds attached thereto, each mold consisting of a pair of jaws fashioned to completely inclose a bunch, and shaped to impart the desired shape to the bunch, the jaws comprising each mold being separated from each other, each jaw attached directly to the flexible strip, and the space of separation being bridged by the flexible strip.

3. A cigar-mold consisting of a flexible strip, and a plurality of molds attached thereto, each mold consisting of a pair of jaws fashioned to completely inclose a bunch, and shaped to impart the desired shape to the bunch, the jaws comprising each mold being separated from each other, each jaw attached directly to the flexible strip, and the space of separation being bridged by the flexible strip, each such mold being separated from others of such molds by a space, the space of separation being bridged by the flexible strip.

In testimony whereof I have hereunto set my hand in presence of two subscribing witnesses.

ALFRED S. KOCH.

Witnesses:
LOYD C. KOCH,
LEONARD L. LEWIS.